US008589499B2

(12) United States Patent
Raymond

(10) Patent No.: US 8,589,499 B2
(45) Date of Patent: *Nov. 19, 2013

(54) REAL-TIME STORAGE AREA NETWORK

(75) Inventor: Michael A. Raymond, Eagan, MN (US)

(73) Assignee: Silicon Graphics International Corp., Fremont, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 12/907,867

(22) Filed: Oct. 19, 2010

(65) Prior Publication Data

US 2011/0093594 A1 Apr. 21, 2011

Related U.S. Application Data

(63) Continuation of application No. 10/434,340, filed on May 9, 2003, now Pat. No. 7,818,424.

(60) Provisional application No. 60/378,941, filed on May 10, 2002.

(51) Int. Cl.
*G06F 15/16* (2006.01)
(52) U.S. Cl.
USPC .......................................................... 709/206
(58) Field of Classification Search
USPC .......................................... 709/225, 226, 229
See application file for complete search history.

(56) References Cited

U.S. PATENT DOCUMENTS

| 5,548,579 | A | * | 8/1996 | Lebrun et al. ................. 370/431 |
| 5,907,683 | A | | 5/1999 | Engelsiepen et al. |
| 6,310,886 | B1 | | 10/2001 | Barton |
| 6,996,670 | B2 | | 2/2006 | Delaire et al. |
| 7,035,230 | B1 | * | 4/2006 | Shaffer et al. ................. 370/261 |
| 7,818,424 | B2 | * | 10/2010 | Raymond ...................... 709/225 |
| 2002/0049841 | A1 | * | 4/2002 | Johnson et al. ............... 709/225 |
| 2002/0065916 | A1 | | 5/2002 | Ooe et al. |
| 2003/0016649 | A1 | | 1/2003 | Connors |

FOREIGN PATENT DOCUMENTS

| WO | 00/72157 | 11/2000 |
| WO | 02/25446 | 3/2002 |

OTHER PUBLICATIONS

Haskin, et al., "The Tiger Shark File System", 1996 Technologies for the Information Superhighway, IEEE Computer Society Computer Conference, 1996, vol. CONF. 41, pp. 226-231.
Haskin, "Tiger Shark-A scalable file system for multimedia", IBM J. RES. Develop., 1998, vol. 42, No. 1, pp. 185-197.
Holton, et al., "XFS" A Next Generation Jounalled 64-Bit Filesystem With Guaranteed Rate I/O, Internet White Paper, 1995.
Ellis, et al., "Getting Started with XFS Filesystems, Chapter 5: Guaranteed-Rate I/O", Silicon Graphics Online Manual, 1995, pp. 91-109.

(Continued)

*Primary Examiner* — Scott Christensen
(74) *Attorney, Agent, or Firm* — Lewis Roca Rothgerber LLP

(57) ABSTRACT

A cluster of computing systems is provided with guaranteed real-time access to data storage in a storage area network. Processes issue request for bandwidth reservation which are initially handled by a daemon on the same node as the requesting processes. The local daemon determines whether bandwidth is available and, if so, reserves the bandwidth in common hardware on the local node, then forwards requests for shared resources to a master daemon for the cluster. The master daemon makes similar determinations and reservations for resources shared by the cluster, including data storage elements in the storage area network and grants admission to the requests that don't exceed total available bandwidth.

21 Claims, 2 Drawing Sheets

(56) References Cited

OTHER PUBLICATIONS

Pinnacle Systems—Product Summary—Palladium Store web page, accessed May 2, 2003.
White Paper on "Hard Disk Technology in Palladium Store 1000" Pinnacle Systems, Inc., 2003, pp. 1-6.
The Essentials of Networked Media, Pinnacle Systems, Inc., 2003, pp. 1-13.
Palladium Store Solutions—Choosing the Right Network Storage System for Any Application, Pinnacle Systems, Inc., 2003, pp. 1-4.
Fibre Channel, Jul. 30, 2001. Downloaded from <http://web.archive.org/web/20011218122151/searchstorage.techtarget.com/sDefinitiion/0,,sid5_gci212114,00 html> Jan. 10, 2007.
Ellis, Susan and Levine, Steven. IRIX Admin. Disks and Filesystems. Jan. 8, 2001.
Content Delivery Solutions, Pinnacle Systems, Inc., 2003, pp. 1-23.
Pinnacle Systems—Palladium Store—Palladium Store Family Key Features web page, May 2, 2003.
Raymond, Notice of Allowance, U.S. Appl. No. 10/434,340, Aug. 9, 2010, 5 pgs.
Raymond, Notice of Allowance, U.S. Appl. No. 10/434,340, Jun. 16, 2010, 18 pgs.
Raymond, Notice of Allowance, U.S. Appl. No. 10/434,340, Jul. 22, 2010, 3 pgs.
Raymond, Office Action, U.S. Appl. No. 10/434,340, Sep. 7, 2007, 16 pgs.
Raymond, Office Action, U.S. Appl. No. 10/434,340, Nov. 16, 2009, 18 pgs.
Raymond, Office Action, U.S. Appl. No. 10/434,340, Oct. 17, 2008, 17 pgs.
Raymond, Office Action, U.S. Appl. No. 10/434,340, Jan. 29, 2007, 15 pgs.
Raymond, Office Action, U.S. Appl. No. 10/434,340, May 29, 2009, 16 pgs.
Raymond, Office Action, U.S. Appl. No. 10/434,340, Mar. 31, 2008, 18 pgs.
Silicon Graphics Inc., Office Action, EP 03733979.3, Oct. 4, 2005, 6 pgs.
Silicon Graphics Inc., Office Action, EP 03733979.3, May 11, 2006, 4 pgs.
Silicon Graphics Inc., Office Action, JP 2004-504116, Jul. 15, 2008, 16 pgs.

* cited by examiner

REAL-TIME STORAGE AREA NETWORK

CROSS-REFERENCE TO RELATED APPLICATION

This application is a continuation of U.S. application Ser. No. 10/434,340 now U.S. Pat. No. 7,818,424, which is related to and claims priority to U.S. Provisional Application No. 60/378,941, both of which are incorporated by reference herein.

TECHNICAL FIELD OF THE INVENTION

The present invention is directed to real-time computer processing and, more particularly, to accessing a storage area network by real-time computer systems.

BACKGROUND OF THE INVENTION

Real-time access to storage is needed by many applications, such as broadcast, multicast and editing of digital media files, and sensor data collection and processing. Many ways of providing real-time data access have been proposed and implemented including Guaranteed Rate I/O (GRIO) disk bandwidth scheduler, available from Silicon Graphics, Inc. (SGI) of Mountain View, Calif. In conjunction with the XLV disk volume manager, also available from SGI, guaranteed disk bandwidth reservations are provided by GRID at the local client level. Bandwidth reservations can be attached to individual files or entire file systems and can be shared between processes. The local storage has to be configured appropriately to support GRIO. If the amount of data required by an application is greater than can be provided by a single disk, the disk must be in a volume with the data striped across several disks or staggered to multiple disks so that different processes can access different disks independently.

GRIO is an integral part of the I/O system in IRIXO (SGI's version of UNIX) to ensure that real-time access can be guaranteed. GRIO uses a frame-based disk block scheduler without reordering requests and maintains a database of the different pieces of hardware in the system and their bandwidth characteristics. When a bandwidth reservation is received from a process executing on the local client node, determinations of available bandwidth are made for components along the entire physical I/O path, starting with the I/O adapter accessed by multiple processors and ending with the local data storage. The total reservations for all processes at each component along the path is kept below the total available bandwidth for that component. If this level would be exceeded, the GRID daemon denies admission to the request. Excess capacity may be used for overband consumption by a process provided the remaining reservations will not be adversely affected during the period of the overband request.

Although GRIO is available for individual client nodes, no known client software solutions provide guaranteed real-time access to data storage shared by a cluster of nodes via a storage area network (SAN). The closest known solution is to copy files stored on a SAN to local storage and use GRID to control synchronization of accesses to the files in local storage. This technique is adequate for some uses, such as non-linear editing; but is less than desirable for large-scale on-demand multicasting of video files, for example, due to the large amount of extra local storage that would be required and would not be needed if real-time access to the resources of the SAN could be guaranteed.

There are several benefits of SANs that are not obtained by the solution described above. Fault tolerance for accesses to the data is one of the primary benefits of a SAN. In addition, load balancing and enabling heterogeneous client access to the same physical storage are also benefits that can be obtained by a clustered file system using a SAN.

Other ways of obtaining some of these benefits include modifying disk controller firmware to schedule and reorder data requests and using intelligent disk networks as proposed by Nagle in "Active Storage Nets", DARPA/ITO Active Nets Meeting July 1998. Nagle proposed a network of intelligent disk drives that can rearrange their striping configuration as needed to meet quality of service guarantees. This requires adding intelligence to the disk drives and providing an actively reconfigurable network linking the intelligent disk drives. A simpler solution requiring fewer modifications to a cluster file system that provides access to a SAN is preferable from a cost-benefit perspective.

SUMMARY OF THE INVENTION

It is an aspect of the present invention to provide guaranteed data access rates to shared cluster storage.

It is another aspect of the present invention to provide guaranteed data access rates to shared cluster storage without requiring hardware modifications to storage devices or the interconnect.

It is a further aspect of the present invention to provide real-time access to files for broadcasting or multicasting while simultaneously permitting editing of files that are not currently being broadcasted or multicasted.

It is yet another aspect of the present invention to enable a process on one of the nodes in a cluster to determine whether a request for access to shared resources can be granted without requiring communication with other nodes in the cluster.

The above aspects can be attained by a method of accessing a storage area network by real-time applications, including requesting, from a master daemon by the real-time applications executing on nodes in the storage area network, reservation of bandwidth to access resources in the storage area network; and scheduling, by the master daemon, access to the resources in the storage area network by each real-time application. The scheduling may be performed by determining available bandwidth along a path required by each request; and granting admission to the resources of the storage area network only if total bandwidth reservations of all granted requests will be less than total available bandwidth.

Available bandwidth is preferably determined by determining a path from an input/output interface at the nodes in the storage area network issuing the request to each at least one storage element in the storage area network; and determining available bandwidth for at least one component along the path. These determinations are made using a master database of the reserved bandwidth and the total available bandwidth of components capable of being shared by the nodes in the storage area network and local databases of the reserved bandwidth for locally issued requests and the total available bandwidth for local node components shared by processes executed at each node that issues requests for bandwidth reservations.

Preferably, the method also includes distributing to each requesting node at least one schedule determined during scheduling by the master daemon; and limiting accesses to the resources in the storage area network by each real-time application on each requesting node according to a corresponding schedule included in the at least one schedule.

Optionally, the method may include reserving, by the nodes in the storage area network, an additional amount of bandwidth not requested by one of the real-time applications.

In this case, the method preferably includes allocating, by a local daemon on one of the nodes in the storage area network, the additional amount of bandwidth for access to the storage area network, to applications executing on the one of the nodes and for which no bandwidth request was issued to the master daemon. Further, the allocating of the additional amount of bandwidth preferably includes allocating bandwidth to at least one of the real-time applications for which a bandwidth request was granted by the local daemon without requiring that the local daemon request additional bandwidth from the master daemon for the one of the nodes. Optionally, the additional bandwidth may also be used by applications that have not issued a bandwidth reservation request.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

A more complete understanding of embodiments of the invention will be apparent from the detailed description taken in conjunction with the accompanying drawings in which.

DETAILED DESCRIPTION OF THE INVENTION

The present invention my be implemented in a SAN accessed by a cluster of computing systems each running UNIX or IRIX and a clustered file system, such as CXFS and volume manager XVM, both from SGI. Additional details of such an operating environment are provided in U.S. patent applications entitled CLUSTERED FILE SYSTEM having Ser. No. 10/162,258 by Costello et al., filed Jun. 5, 2002, and MESSAGING BETWEEN HETEROGENEOUS CLIENTS OF A STORAGE AREA NETWORK by Cruciani et al. and MULTI-CLASS HETEROGENEOUS CLIENTS IN A CLUSTERED FILE SYSTEM by Moore et al., both filed Apr. 16, 2003, all of which are incorporated herein by reference.

Figure 1:
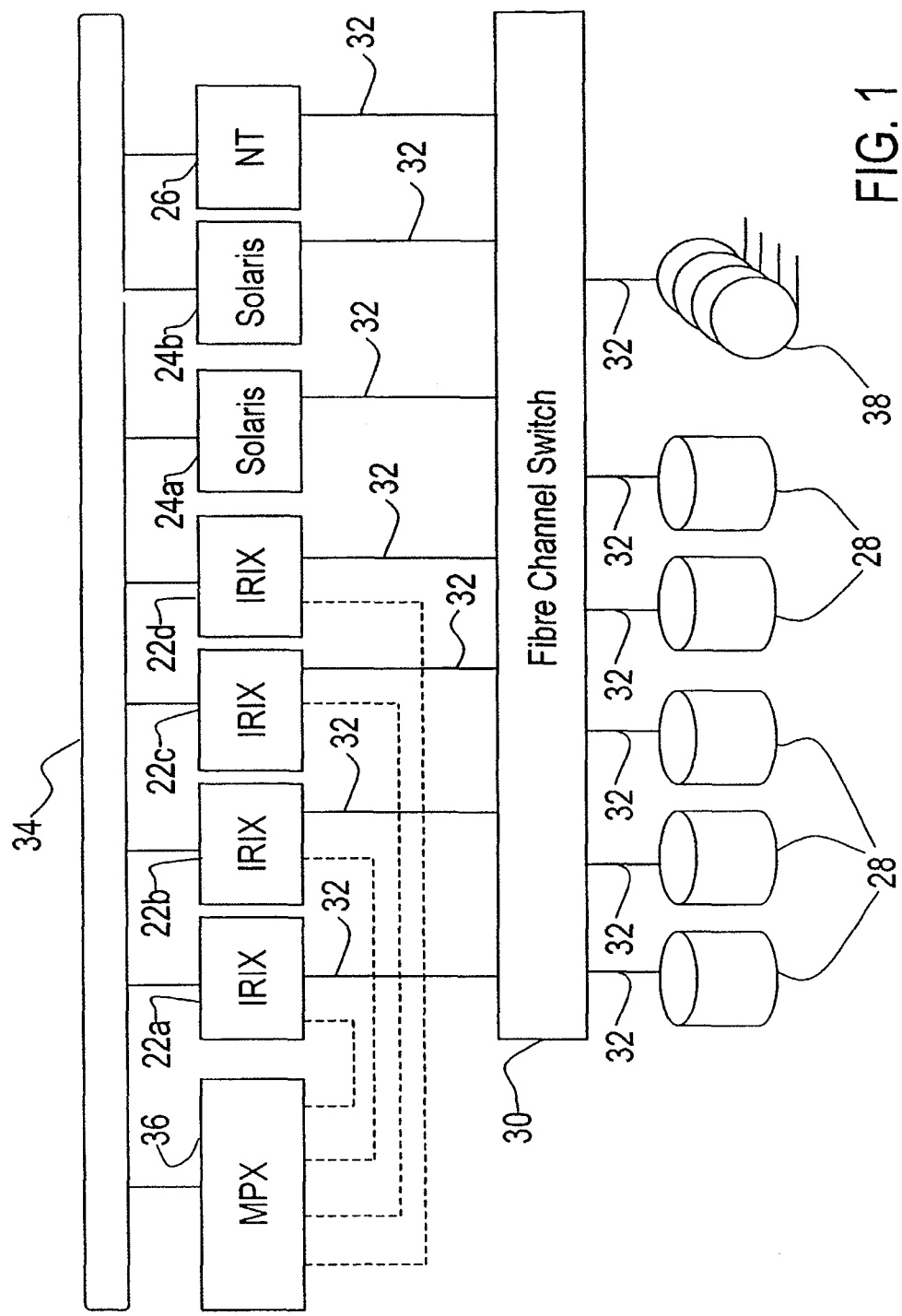
FIG. 1 is a block diagram of a cluster of computing systems connected to a SANl

An example of such a cluster is illustrated in FIG. 1. In the example illustrated in FIG. 1, nodes 22 run the IRIX operating system from SGI while nodes 24 run the SolariS™ operating system from Sun Microsystems, Inc. of Santa Clara, Calif. and node 26 runs the Windows NT operating system from Microsoft Corporation of Redmond Wash. Each of these nodes is a conventional computer system including at least one, and in many cases several processors, local or primary memory, some of which is used as a disk cache, input/output (I/O) interfaces, and I/O devices, such as one or more displays or printers. According to the present invention, the cluster includes a storage area network in which mass or secondary storage, such as disk drives 28 are connected to nodes 22, 24, 26 via Fibre Channel switch 30 and Fibre Channel connections 32. The nodes 22, 24, 26 are also connected via a local area network (LAN) 34, such as an Ethernet, using TCP/IP to provide messaging and heartbeat signals. A serial port multiplexer 36 may also connected to the LAN and to a serial port of each node to enable hardware reset of the node. In the example illustrated in FIG. 1, only IRIX nodes 22 are connected to serial port multiplexer 36.

Other kinds of storage devices besides disk drives 28 may be connected to the Fibre Channel switch 30 via Fibre Channel connections 32. Tape drives 38 are illustrated in FIG. 1, but other conventional storage devices may also be connected. Alternatively, disk drives 28 or tape drives 38 (or other storage devices) may be connected to one or more of nodes 22, 24, 26, e.g., via SCSI connections (not shown).

One use for a cluster like that illustrated in FIG. 1 is a video broadcast studio in which video clips are stored in files on disk drives 28 (or tape drives 38). Non-linear video editors running on heterogeneous nodes 22, 24, 26 modify the video files while the files are accessible for broadcasting on television. A cluster aware real-time scheduler according to the present invention ensures that the timing needs and total bandwidth of the playback servers are met.

CXFS allows direct access to the SAN 28, 30, 32 from all the connected clients 22, 24, 26 and maintains coherency by leasing out tokens for various actions. For instance, read/write tokens exist for access to individual files and tokens exist for allocating new disk block extents. One of the nodes 22 serves as a metadata server for each file system and controls granting and replication of tokens. Relocation recovery of metadata servers is supported in CXFS.

To be able to efficiently resolve bandwidth utilization conflicts between different clients, in the preferred embodiment each client node 22, 24 or 26 runs a daemon named ggd which responds to requests for guaranteed access to any data. Each bandwidth reservation request preferably includes at least one storage element, a required periodic bandwidth, e.g., 1 MB per second, a start time and a duration of the reservation for access to the at least one storage element.

Figure 2:
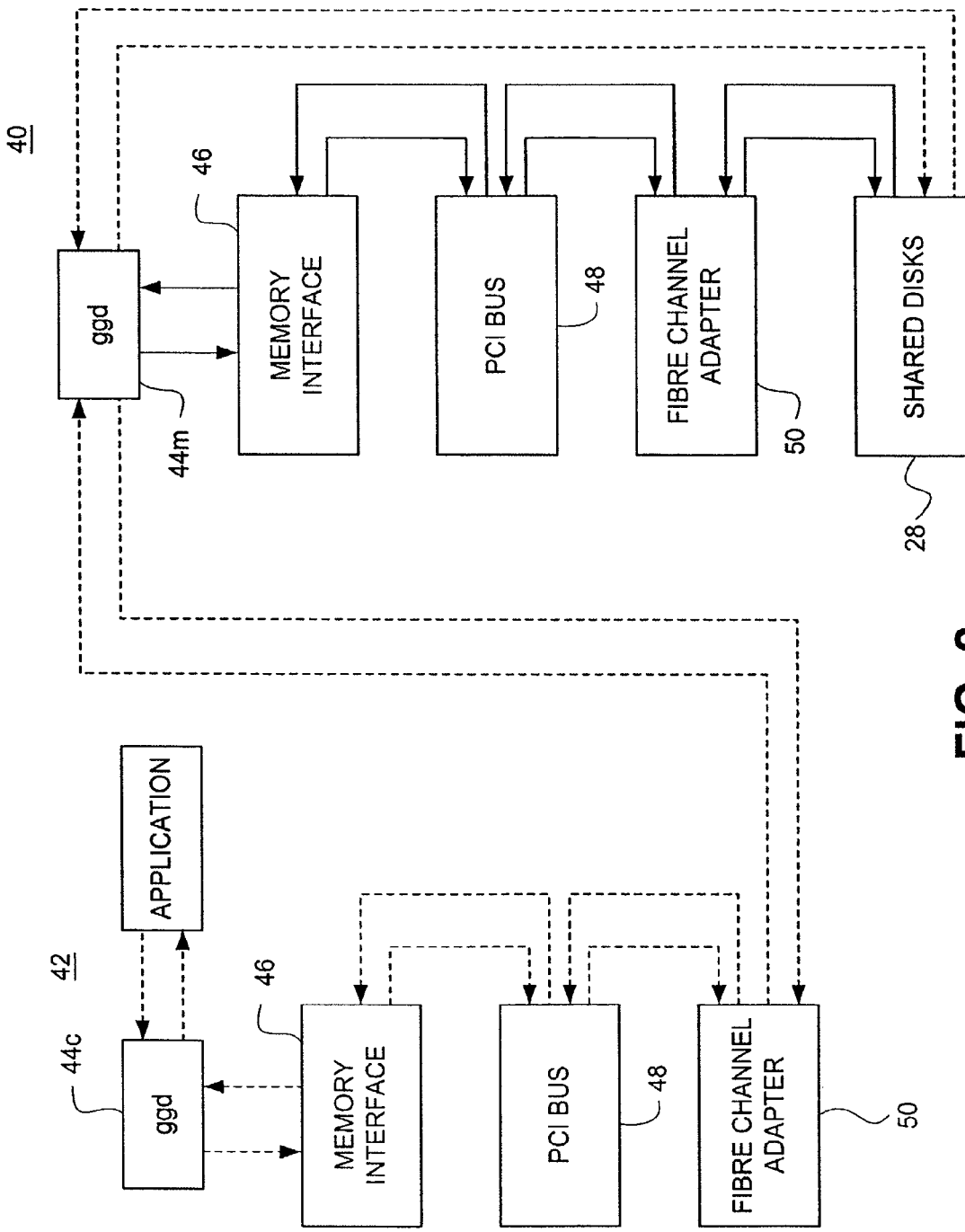
FIG. 2 is a block diagram of components in two nodes and shared components in a SAN to illustrate the process of determining whether to grant a bandwidth reservation request.

As illustrated in FIG. 2, one of the nodes serves as master node 40. The remaining nodes are represented by client node 42. The functions performed by ggd 44m in master node 40 are essentially the same as those in ggd 44c in client node 42. In fact, ggd 44m receives requests from processes executing on master node 40, as well as those received from other nodes 42 for managing bandwidth request to shared resources. When referring to operations performed by both ggd 44c and ggd 44m, reference will be made to ggd 44.

On each node 42, 44, ggd 44 maintains a database of hardware with the total available or maximum bandwidth and total requested bandwidth. In addition, the hardware path to memory component is stored in the database, so that the available bandwidth of components along the path can be determined. The total requested bandwidth is the bandwidth set aside for processes that issued bandwidth reservation requests. The total available bandwidth may be less than the capacity of the specific hardware, if other processes use the shared hardware without making a bandwidth reservation request. However, it is preferred that all accessing applications and nodes in SAN 28, 30, 32 issue requests to local daemon ggd 44c (and through ggd 44c to ggd 44m if a shared resource is requested). Preferably, the total requested bandwidth is determined from information from each request that is maintained in the database. When the reserved time determined by the start time and duration has passed, the reservation request is removed from the database and the total requested bandwidth is reduced by the amount of bandwidth in that request.

Bandwidth reservations are made as nested transactions for hardware components shared by multiple processes. In a cache coherent multiprocessor systems like those manufactured by SGI, ggd 44 starts with the common point where all processors in the node 40 or 42 meet the I/O hardware at a memory interface 46. On receipt of a request, ggd 44 queries the kernel for the hardware path to the requested storage element. With this information, ggd 44 loops down the path determining whether each part has enough unreserved bandwidth to admit the request. This is illustrated in the case of the client node by the directed-lines between memory interface 46, PCI Bus 48 and Fibre Channel Adapter 50. When ggd 44*c* in client node 42 determines that all hardware in its node has sufficient unreserved bandwidth, a request is issued to the master daemon in node 40 to check the available bandwidth of hardware shared throughout the cluster.

In the embodiment illustrated in FIG. 2, only shared disks 28 are shown as being queried for unreserved bandwidth by ggd 44*m* in response to a request from client node 42, as indicated by the dashed lines. This might be the case where the at least one component in the request includes a portion of disk storage in the storage area network and the other components in the storage area network have sufficient capacity that the only bottleneck could occur in the shared disk. Preferably, the database maintained by ggd 44*m* includes any hardware in SAN 28, 30, 32 where a bottleneck could occur, such as Fibre Channel Adapters, Fibre Channel switches, disk controllers, etc. If each of the at least one component, i.e., storage element(s) on shared disk 28, in the request for bandwidth reservation is determined by ggd 44*m* to have available bandwidth exceeding the required periodic bandwidth in the request, ggd 44*m* sends a message to ggd 44*c* granting admission to the request and increases the total requested bandwidth in the database maintained on the shared cluster components. Similarly, ggd 44*c* updates its database for the components in node 42 shared by multiple processes.

As an alternative to the master daemon maintaining a master database of requests to shared resources of the SAN 28, 30, 32, a percentage of the total bandwidth of the shared resources of the SAN 28, 30, 32 may be allocated to each node 42, either by a master daemon, or by messages transmitted between the local ggd 44*c* in each node 42. In this alternative, the local ggd 44*c* in each node 42 would maintain information about the shared resources of the SAN 28, 30, 32 allocated thereto in addition to the shared resources within the node 42 itself.

Unlike the GRIO product from SGI, ggd 44*c* may not permit overband utilization of shared resources. This would ordinarily require additional communication between nodes during execution of a process. Given the time required to grant such access and the additional complexity to provide for the required communication, it is preferable in a system of generally under-utilized bandwidth to make bandwidth reservations that are high enough to avoid overband situations. Alternatively, client node 42 may issue to ggd 44*m* an additional bandwidth reservation request for processes executing on client node 42 without a specific request from one of those processes. If granted by ggd 44*m*, the additional bandwidth reservation may be allocated by ggd 44*c* to processes on client node 42 that have not issued any bandwidth reservation requests, or to provide additional bandwidth to processes that issued a request, but need to exceed the bandwidth granted by ggd 44*m*.

The present invention has been described with respect to an embodiment using SGI hardware and software However, the invention is not limited to SGI hardware and software, or for use with video editing and broadcasting.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of accessing a storage area network by real-time applications, comprising:
  receiving, at a local daemon executing on a node, from a real-time application executing on the node, a request for reservation of a specified amount of bandwidth to access components in the storage area network to a requested storage element;
  determining, by the local daemon, that each component along a local path in the node to the requested storage element has sufficient bandwidth for the request from the real-time application executing on the node;
  determining whether the request includes access to a shared resource;
  providing the request for reservation of a specified amount of bandwidth to a master daemon from the local daemon in response to the request including a shared resource and each component along the local path having sufficient bandwidth;
  receiving at the local daemon a schedule of accesses requested by the real-time application from the master daemon in response to providing the request, the schedule comprising an access determination to the requested storage element based on a determined available bandwidth along a remote path outside of the node including the shared resource required by the request and the specified amount of bandwidth; and
  allowing access to the storage area network by the real-time application while limiting accesses to the components shared in the storage area network by the real-time application on the node according to the schedule.

2. A method as recited in claim 1, further comprising reserving, by the local daemon in the storage area network without a specific request from any real time application, an additional amount of bandwidth not included in the specified amount of bandwidth previously requested by the real-time application.

3. A method as recited in claim 2, further comprising allocating, by the local daemon executing on the node in the storage area network, the additional amount of bandwidth reserved for access to the storage area network to other applications executing on the node and for which no bandwidth request was issued to the local daemon.

4. A method as recited in claim 3, wherein allocating of the additional amount of bandwidth further includes allocating bandwidth to at least one of the real-time applications for which a bandwidth request was granted by the local daemon without requiring that the local daemon request additional bandwidth for the at least one of the real-time applications.

5. A method as recited in claim 1, wherein the path is from a node in the storage area network issuing the request to at least one data storage element in the storage area network.

6. A method as recited in claim 1, wherein the request identifies the at least one storage element, a required periodic bandwidth, a start time, and a duration of a reservation for access to the at least one storage element.

7. A method as recited in claim 1, wherein said determining comprises:
  determining a path from an input/output interface at the node in the storage area network issuing the request to at least one storage element; and determining available bandwidth for at least one component along the path.

8. A method as recited in claim 6, wherein access is granted if each of the at least one component has available bandwidth exceeding the required periodic bandwidth identified by the request and includes increasing reserved bandwidth at each of the at least one component by the required periodic bandwidth identified by the request.

9. A method as recited in claim 1, further comprising:
maintaining, by the local daemon, a local database of the reserved bandwidth for locally issued requests and the total available bandwidth for local node components shared by processes executed at that node.

10. A method as recited in claim 1, wherein the at least one component includes a portion of disk storage in the storage area network.

11. A method as recited in claim 10, wherein the at least one component further includes a host bus from system memory to a Fibre Channel adapter.

12. A non-transitory computer readable storage medium storing instructions that when executed by at least one processor control a computing system to perform a method of accessing a storage area network by real-time applications, said method comprising:
receiving, at a local daemon executing on a node, from a real-time application executing on the node, a request for reservation of a specified amount of bandwidth to access components in the storage area network to a requested storage element;
determining, by the local daemon, that each component along a local path in the node to the requested storage element has sufficient bandwidth for the request from the real-time application executing on the node;
determining whether the request includes access to a shared resource;
providing the request for reservation of a specified amount of bandwidth to a master daemon from the local daemon in response to the request including a shared resource and each component along the local path having sufficient bandwidth;
receiving at the local daemon a schedule of accesses requested by the real-time application from the master daemon in response to providing the request, the schedule comprising an access determination to the requested storage element based on a determined available bandwidth along a remote path outside of the node including the shared resource required by the request and the specified amount of bandwidth; and
allowing access to the storage area network by the real-time application while limiting accesses to the components shared in the storage area network by the real-time application on the node according to the schedule.

13. A non-transitory computer readable storage medium as recited in claim 12, the instructions further operable to:
reserve, by the local daemon in the storage area network without a specific request from any real time application, an additional amount of bandwidth not included in the specified amount of bandwidth previously requested by the at least one real-time application.

14. A non-transitory computer readable storage medium as recited in claim 13, the instructions further operable to:
allocate, by the local daemon executing on the node in the storage area network, the additional amount of bandwidth reserved for access to the storage area network to other applications executing on the node and for which no bandwidth request was issued to the local daemon.

15. A non-transitory computer readable storage medium as recited in claim 14, wherein allocating of the additional amount of bandwidth further includes allocating bandwidth to at least one of the real-time applications for which a bandwidth request was granted by the local daemon without requiring that the local daemon request additional bandwidth for the at least one of the real-time applications.

16. A non-transitory computer readable storage medium as recited in claim 12, wherein the path is from a node in the storage area network issuing the request to at least one data storage element in the storage area network.

17. A non-transitory computer readable storage medium as recited in claim 12, wherein the request identifies the at least one storage element, a required periodic bandwidth, a start time, and a duration of a reservation for access to the at least one storage element.

18. A non-transitory computer readable storage medium as recited in claim 12, wherein said determining comprises:
determining a path from an input/output interface at the node in the storage area network issuing the request to at least one storage element; and
determining available bandwidth for at least one component along the path.

19. A non-transitory computer readable storage medium as recited in claim 17, wherein access is granted if each of the at least one component has available bandwidth exceeding the required periodic bandwidth identified by the request and includes increasing reserved bandwidth at each of the at least one component by the required periodic bandwidth identified by the request.

20. A non-transitory computer readable storage medium as recited in claim 12, the instructions further operable to:
maintain, by the local daemon, a local database of the reserved bandwidth for locally issued requests and the total available bandwidth for local node components shared by processes executed at that node.

21. A cluster of computer systems, comprising:
a storage area network having shared components; and
a computer system node, coupled to said storage area network, executing at least one real-time application issuing requests to a local daemon executing on the computer system node;
wherein the request is for reservation of a specified amount of bandwidth to access the components in the storage area network to a requested storage element; and
wherein the local daemon determines whether each component of the node along a local path in the node to the requested storage element has sufficient bandwidth for the request, and requests from a master daemon the specified amount of bandwidth to access the components;
wherein the local daemon determines whether the request includes access to a shared resource;
wherein the local daemon provides the request for reservation of a specified amount of bandwidth to a master daemon from the local daemon in response to the request including a shared resource and each component along the local path having sufficient bandwidth;
wherein the local daemon receives a schedule for access to the shared components in the storage area network by the real-time application in response to the request to the master daemon, the schedule comprising an access determination to the requested storage element based on a determined available bandwidth along a remote path outside the node including the shared resource required by the request and the specified amount of bandwidth; and wherein the real-time application is allowed access to the shared components in the storage area network while limiting access to the shared components in the storage area network by the real-time application based on the schedule.

* * * * *